Nov. 10, 1942.  W. BALHATCHET  2,301,187
PLASTERING DEVICE
Filed June 19, 1939
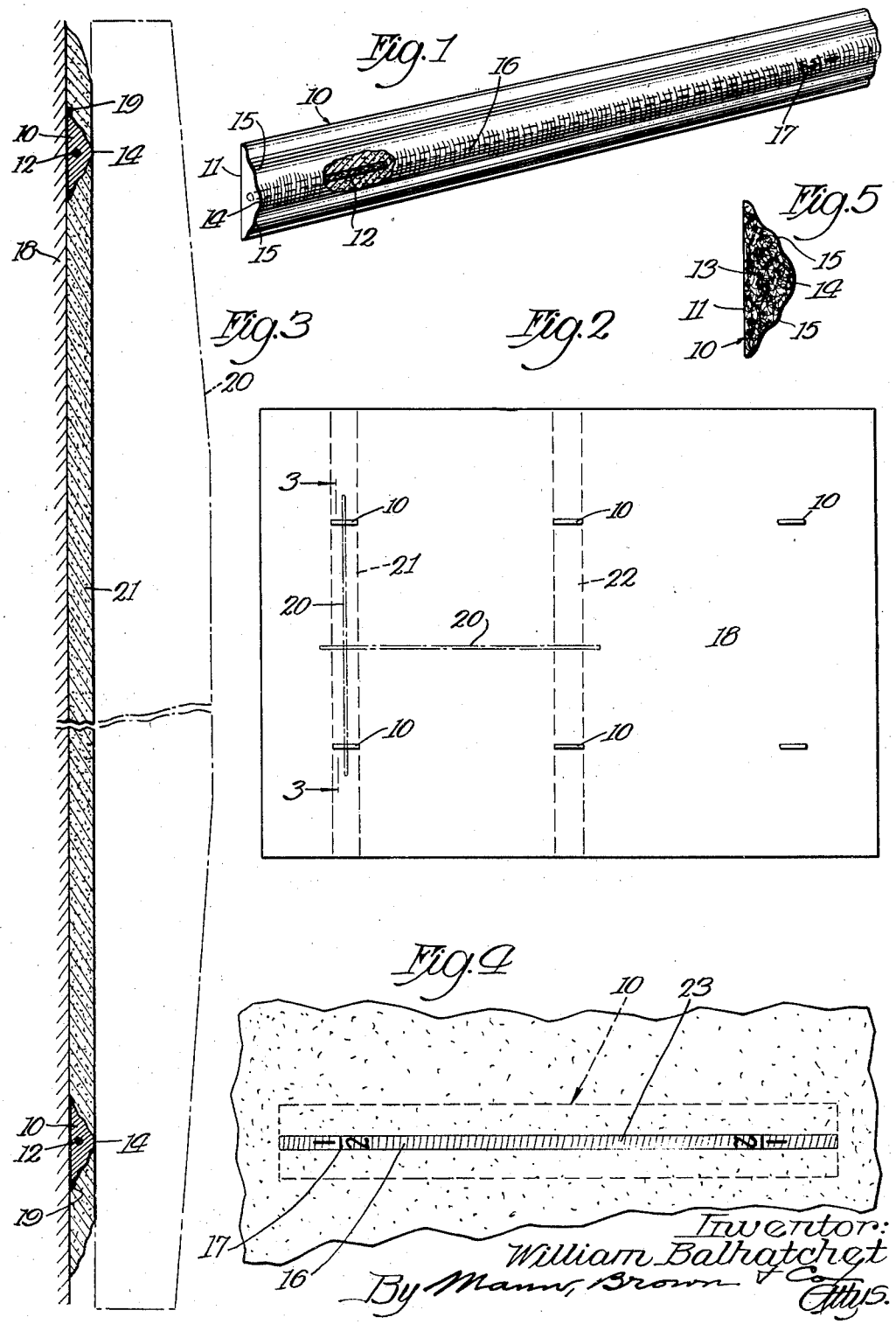
Inventor:
William Balhatchet
By Mann, Brown & Co.
Attys.

Patented Nov. 10, 1942

2,301,187

UNITED STATES PATENT OFFICE 2,301,187

PLASTERING DEVICE

William Balhatchet, Wilmette, Ill.

Application June 19, 1939, Serial No. 279,886

13 Claims. (Cl. 72—128)

The present invention relates to plastering and more particularly to a means whereby the correct thickness of plaster is assured.

In plastering, the most important part of the installation is the thickness of the plaster coating. If the proper thickness is lacking the walls and ceilings do not have enough body to endure for any length of time. They soon begin to crack and show signs of deterioration. Repairs cannot be made that will be durable and, after such an experience with inferior walls, owners of the building consider the installation wholly unsatisfactory.

It is with the brown coat or under coat that thickness is important. The top or white coat is seldom more than enough to give an adequate coverage and finish, and the scratch or first coat is primarily concerned with filling the lath or backing with enough plaster forced through the lath to lock the plaster in place in supported relation.

After the scratch coat is applied, the brown coat is spread and it is the thickness of the brown coat that determines the thickness of the plaster.

Much depends upon the proper thickness being present. The guarantees made by manufacturers are founded upon tests made with plastering of a prescribed thickness. This thickness is the main item in the plastering specifications and it governs in determining the quantities of material purchased and the cost of labor estimated. Thus, owners of buildings pay for plaster materials upon the basis of the prescribed thickness and expect to have in return for their money the longevity and ability of the plastering to withstand shocks and hard usage according to the tests made by the manufacturers.

Whatever the prescribed thickness may be for plastering it is important that that thickness be assured for the protection of everybody concerned. Without positive assurance that the minimum thickness is provided, the opportunity to scrimp without detection is an ever present temptation, particularly, under competitive bidding. Scrimping in plastering is commonly know as "skinning" and amounts, whether willfully or inadvertently, to a failure to provide a thickness that is required for proper stability.

"Skinning" has the following results. The owner does not receive that which he expects and for which he pays. The workmen are deprived of work hours since they have less plaster to apply. The plastering industry is discredited to the advantage of substitutes, and the architect receives the full force of the owner's complaints when walls and ceilings fail.

Under the present methods it is virtually impossible to protect the owner or the plastering industry against scrimping because it is not convenient to have a business agent or a disinterested representative present at all times during the plastering operations to measure and see that the minimum thickness requirement is complied with. Moreover, to make proper measurements at the time the plastering is being applied would interfere with operations enough to be seriously objectionable.

Although wood grounds have been placed by carpenters upon a wall before plastering, they are primarily for the purpose of attaching trim, incidentally to procure straightness of plaster where the trim is to be located so that the trim will fit tightly, and are not intended to assist in obtaining a uniformly correct thickness of plaster. In fact, the usual plaster ceiling and walls not adjacent to the wood trim are not provided with grounds and the thickness of plaster on these areas is therefore subject to scrimping.

I provide a device which serves as an absolute check upon the minimum thickness of plaster which at a glance assures the journeyman who uses it, the conscientious contractor who relies upon it, the architect who prescribes it, and the owner who sees it, that the prescribed thickness of the under coat is adhered to.

The present invention also provides a device which acts as a bearing for the plasterer's rod when the brown coat of the plaster is being applied.

Moreover, the device of the present invention makes it much easier for the journeyman to spread a uniform coat with an even surface than was possible with conventional practices, where very often waves in the surface of the brown coat were experienced.

Another object of the invention is to provide a means whereby the prepared surface of the wall and ceiling can be plumbed and leveled before the plastering coat is applied so that spots which otherwise would be thin because of structural irregularities can be detected and corrected.

Another object of the invention is to provide a device of the class described which is easy and inexpensive to manufacture and use, which will not develop cracks after drying, and which, when installed, becomes a permanent part of the plastering without losing its functional identity.

These being among the objects of the present invention, other and further objects regarding the procurement of good plaster work will become apparent from the drawing, the description relating thereto and the appended claims.

Referring now to the drawing:

Fig. 1 is a perspective view of an embodiment of the invention;

Fig. 2 is a plan view of a wall or ceiling showing how the devices are used within the intents and purposes of the present invention;

Fig. 3 is a section taken on the line 3—3 in Fig. 2;

Fig. 4 is a restricted plan view of the wall as it appears after the under coat or brown coat of plastering is completed; and Fig. 5 is a section showing another embodiment of the invention illustrated in Fig. 1.

Although the thickness of the plaster prescribed by the plaster industry may be changed from time to time and it is within the intent of the present invention to provide a device which will assure any prescribed thickness by being constructed accordingly, the present thickness specification for plastering is one-half of an inch, and the device illustrated is constructed to assure this thickness as a minimum thickness.

Referring now to the drawing in further detail, the article illustrated in Fig. 1 is representative of the preferred form which can be made of any material, including metal, which when prepared, inherently or otherwise, provides a bond for the plaster. The article illustrated in Fig. 1, by way of example, comprises a bar 10 that is molded of a material to which plaster will bond, preferably a hard white plaster or statuary plaster commonly known as Barca-Lucca. The bar is reinforced with hemp fibers and in Fig. 1 the hemp fibers comprise a rope 12 running longitudinally through the center of the bar, while in Fig. 5 the hemp content comprises loose fibers 13 mixed throughout the white plaster.

In molding the bar 10, the statuary plaster is poured wet into gelatin molds. The poured side 11 is roughly flat, while as best shown sectionally in Figs. 3 and 5, the molded side is roughly half oval. Although the molded side may be designed in other ways to provide a proper bearing surface and bond, I prefer to provide a central convexly rounded ridge 14 running the length of the bar that is bounded upon both sides by similar secondary ridges 15.

The bar is approximately ten inches long, and at the central ridge 14, the bar is approximately seven-sixteenths of an inch thick. If used where greater thickness of plaster is required the thickness can be varied accordingly.

The surface of the ridge 14 is preferably provided with a ripple finish 16 throughout its length which, if unduly worn, either by itself or in conjunction with the width of the ridge 14 and other indicia, serves as a telltale indication that the thickness of the bar has been tampered with.

Indicia are provided as at 17 where the figures ½ indicate the thickness that is assured by the device and also serve in a manner similar to the ripples 16. Any trade-mark used with the bar is placed upon the rounded surface for the same purpose and these irregularities in the surface also assist in bonding plaster to the bar.

The color of the bar 10 is preferably white although it may be provided with other pigments. However, any color other than white that is selected must not migrate and discolor the finish coating of the plaster.

In use, before any plaster is applied, the bars 10 (Fig. 2) are adhered to the masonry 18, wood lath, gypsum lath or fibrous lath, whatever the nature of the surface to be covered. To do this, the bars are buttered upon the flat side 11 with quick drying molding plaster 19 and pressed into place after first being soaked in water to prevent a burning or setting of the molding plaster when it is applied.

The bars are preferably disposed longitudinally with respect to the long dimension of the space to be plastered and are so spaced that the long wooden rods commonly known as plasterer's rods 20 will reach from one bar to any adjacent bar.

The scratch coat is then applied over all the surface. Thereafter, the plasterer applies the brown coat between the bars in strips 21 which are in width the same dimension as the length of the bars 10. These strips are then "rodded" to a thickness flush with the ridge 14 of the bars. This is repeated for successive pairs of bars 10, as indicated by numerals 22. In this way the strips 21 and 22 provide screeds for filling in the space between the strips 21 and 22. Thus, all the plaster is brought to a thickness of the bars 10. Any skinning between the bars will be readily apparent since the bars 10 will give the appearance of being located on the crests of waves in the ceiling or wall.

In view of the fact that the brown coat is made with sand, the sliding back and forth of the rod 20 will expose a substantial portion of the ridge 14 to the eye, enough for the indicia and the ripples to be seen as at 23 (Fig. 4). Anyone viewing the plastered brown coat and seeing the white strips 23 will know that the entire plaster is of the required thickness, namely, in the example illustrated seven-sixteenths of an inch thick plus the thickness of the buttered plaster supporting the bars 10. Thus, when the finish coat of plaster is applied the industry minimum of one-half is obtained.

Having thus described my invention, it will be seen that any two rods 10 will act as a bearing for the plasterer's rod 20 so that between the rods the plasterer can fill in a strip of brown coat which will serve as a gauge or screed for the remaining area of the surface to be covered.

The bars 10 insure that the thickness of the brown coat will be not less than the minimum thickness of the bar 10 without detection being had immediately.

The white strip 23 upon a brown background is a telltale or guarantee that the minimum thickness requirement has been complied with. The owner merely requires that he be permitted to see the rough coat before the finish coat is applied. A brief inspection apprises the owner as to the fulfillment of the requirement.

The bar also serves as a means to plumb walls or level ceilings. If there is a low spot, the thickness of the butter coat with which the bar is adhered is increased at the low point to bring the edge of the ridge 14 out flush with the other bars. Then when the brown coat is applied the surface is even throughout, the finishing coat can be applied after inspection and when complete a good wall within the requirements of the industry is provided.

Consequently, although I have described a specific embodiment in some detail and certain preferred embodiments have been shown, it will be apparent to those skilled in the art that various uses, modifications and changes may be made without departing from the spirit and substance of the invention, the scope of which is commensurate with the appended claims.

What is claimed is:

1. An article of manufacture comprising a bar of granular material reinforced by fibers or the like, and configured with a characteristic bearing surface for a plasterer's rod or the like to indicate by its appearance wear or tampering therewith.

2. An article of manufacture of the class described comprising an elongated distinguishingly colored plaster member provided with a gauged bearing surface for a plasterer's rod, means for structurally reinforcing said member.

3. A molded article of manufacture made of a granular material comprising an elongated body portion, a bearing surface for a plasterer's rod provided with wear detecting means, means for structurally reinforcing the body portion during handling, and means for bonding the body portion with plaster.

4. An article of manufacture of the class described comprising an elongated member having a gauged bearing surface for a plasterer's rod, means for reinforcing said member structurally within its own structure.

5. An article of manufacture of the class described comprising a member adapted to be supported upon a wall to be plastered, and having a gauged bearing surface for a plasterer's rod, means upon said surface including indicia removable by wear for indicating any wear developed that substantially varies the thickness of the member.

6. An article of manufacture of the class described comprising a member adapted to be supported upon a wall to be plastered and having a gauged bearing surface for a plasterer's rod, means upon said surface for indicating any wear developed by the rod, and means for reinforcing the member structurally during handling thereof.

7. In combination with a wall to be covered with plaster, a plurality of elongated members spaced from each other a distance within the length of a plasterer's rod, means for supporting the members on the wall, said members providing a bearing surface for the rod, said surface being exposed by the rod to serve as a plaster thickness telltale readily apparent before the final coat of plaster is applied.

8. A device of the class described comprising a cast plaster, substantially half oval bar approximately ten inches long and seven-sixteenths of an inch thick, rippled upon its curved portion and provided with indicia upon its curved face for telltale detection.

9. A device of the class described comprising a cast plaster bar approximately ten inches long and seven-sixteenths of an inch thick, corrugated and rippled upon one face thereof and provided with indicia upon its curved face for telltale detection.

10. A combination gauge, plumb, telltale and bearing for applying plaster uniformly and with an even surface on a wall space comprising a molded bar made of a granular material, said bar being provided with a surface adapted to engage a plasterer's rod to control the thickness of plaster applied to the wall.

11. In combination with a wall to be covered with plaster, an article of manufacture comprising a cast bar of cementitious material reinforced by fibers, and means for permanently securing the article to the wall, said article being provided with a telltale gauged bearing surface for a plasterer's rod.

12. In combination with a wall to be covered with plaster, a pair of plastering bars comprising members formed of a material to which plaster will adhere and spaced from each other, a quick drying molding plaster for permanently securing the bars on the wall.

13. An article of manufacture comprising a bar cast of a material to which plaster will adhere, reinforced by a fibrous material, and provided with a rippled bearing surface for a plasterer's rod.

WILLIAM BALHATCHET.